US009011950B2

(12) United States Patent
Bilet et al.

(10) Patent No.: US 9,011,950 B2
(45) Date of Patent: *Apr. 21, 2015

(54) CRISPY FRENCH FRIES

(75) Inventors: Maxime Jean Jerome Bilet, Bellevue, WA (US); Nathan P. Myhrvold, Bellevue, WA (US); M. G. Johnny Zhu, Bellevue, WA (US)

(73) Assignee: Elwha LLC, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/136,976

(22) Filed: Aug. 15, 2011

(65) Prior Publication Data

US 2012/0070548 A1  Mar. 22, 2012

Related U.S. Application Data

(63) Continuation of application No. 12/924,039, filed on Sep. 17, 2010.

(51) Int. Cl.
*A23L 3/30* (2006.01)
*A23L 1/212* (2006.01)
*A23L 1/217* (2006.01)
*A23L 1/025* (2006.01)
*A23L 1/216* (2006.01)

(52) U.S. Cl.
CPC ............ *A23L 1/217* (2013.01); *A23L 1/0252* (2013.01); *A23V 2002/00* (2013.01); *A23V 2300/48* (2013.01); *A23L 1/2163* (2013.01)

(58) Field of Classification Search
CPC .............................. A23L 1/217; A23L 1/2163
USPC ........................................................ 426/238
See application file for complete search history.

(56) References Cited

U.S. PATENT DOCUMENTS

| | | | | |
|---|---|---|---|---|
| 3,966,980 | A * | 6/1976 | McGuckian | 426/393 |
| 4,317,842 | A * | 3/1982 | El-Hag et al. | 426/302 |
| 4,580,024 | A | 4/1986 | Thomas | |
| 5,097,759 | A | 3/1992 | Vilgrain et al. | |
| 5,123,337 | A | 6/1992 | Vilgrain et al. | |
| 6,068,863 | A | 5/2000 | Dupart et al. | |
| 6,149,959 | A | 11/2000 | Dayley et al. | |
| 6,432,465 | B1 | 8/2002 | Martines-Serna Villagran et al. | |
| 6,514,554 | B1 * | 2/2003 | Minelli et al. | 426/438 |
| 7,056,544 | B2 * | 6/2006 | Xu et al. | 426/52 |
| 2007/0087086 | A1 | 4/2007 | Kalum et al. | |
| 2007/0098865 | A1 | 5/2007 | Hosokawa | |
| 2008/0003340 | A1 | 1/2008 | Karwowski et al. | |
| 2009/0142445 | A1 * | 6/2009 | Kalum | 426/10 |

FOREIGN PATENT DOCUMENTS

WO    WO 03/065814 A1    8/2003

OTHER PUBLICATIONS

Nyati et al., An Evaluation of the Effect of Storage and Processing Temperatures on the Micobological Status of Sous Vide Extended Shelf-Life Products, Food Control 11 (2000) 471-476.*
Mizrach, Ultrasonic Technology for Quality Evaluation of Fesh Fruit and Vegetable in Pre- and Postharvest Processes, Postharvest Biology and Technology 48 (2008) 315-330.*
M. Stones, Electricity and Ultra Sound Boost Potatoes Antioxidant Content by 60 Per Cent, FoodProductionDaily.com, Aug. 24, 2010, accessed at http://www.foodproductiondaily.com/Processing/Electicity-and-ultra-sound-boost-potatoes-antioxidant-content-by-60-per-cent.*
Anon, Investigating Infusion, Food Product Design, Dec. 1, 1995, accessed at http://www.foodproductdesign.com/articles/1995/12/investigating-infusion.aspx.*
Gibbs, et al., Ultrasonic French Fries, Scientific American, Jul. 11, 2011, p. 26-27.*
Univversidad, Development of a Vacuum-Cooking Appliance for Use in the Professional Catering Business, Universidad Politencia De Valencia, 2005 accessed at http://www.le-sanctuaire.com/mm5/graphics/00000001/pdf/GastrovacPoliValencia.pdf.*
Feng, et al., Ultrasound Technologies for Food and Bioprocessing, Food Engineering Series, Springer 2011, p. 5.*
Cui et al., Effect of Ultrasonic Treatment of Brown Rice at Different Temperatures on Cooking Properties and Quality, Cereal Chemistry, Sep. 2010, vol. 87, No. 5 pp. 403-408.*
"Investigating Infusion"; Food Product Design; bearing a date of Dec. 1, 1995; 5 pages; Virgo Publishing; located at: http://www.foodproductdesign.com/articles/1995/12/investigating-infusion.aspx.
Gibbs et al.; "Ultrasonic French Fries"; Scientific American; bearing a date of Jul. 2011; p. 27.
Stones, Mike; "Electicity and Ultra Sound Boost Potatoes' Antioxidant Content by 60 Per Cent"; FoodProductiondaily.com; bearing a date of Aug. 24, 2010; 4 pages; William Reed Business Media SAS; located at: http://www.foodproductiondaily.com/Processing/Electicity-and-ultra-sound-boost-potatoes-antioxidant-content-by-60-per-cent.
UPV; "Development of a Vacuum-Cooking Appliance for Use in the Professional Catering Business"; Universidad Politecnica De Valencia; bearing a date of 2005; pp. 1-8; Fundación Innova; located at: http://www.le-sanctuaire.com/mm5/graphics/00000001/pdf/GastrovacPoliValencia.pdf.
Bilet, et al.; "Starch-Infused Fries"; Modernist Cuisine; Nov. 22, 2011; pp. 1-4; located at: http://modernistcuisine.com/recipes/starch-infused-fries-2/; printed on Feb. 6, 2014; The Cooking Lab.
PCT International Search Report; International App. No. PCT/US2014/048545; Nov. 14, 2014; pp. 1-5.
"Ultrasound Technologies for Food and Bioprocessing (Food Engineering Series)"; Feng et al.; Nov. 19, 2010; Chapter 1; The Physical and Chemical Effects of Ultrasound; 5 pages total (one page of book description; 3 pages of Table of Contents and p. 5).

* cited by examiner

*Primary Examiner* — D. Lawrence Tarazano
*Assistant Examiner* — Philip Dubois

(57) ABSTRACT

Crispy French fry-style food products are prepared by modification of the water content and the texture of the products' surface layers prior to deep frying. The surface modifications include surface firming, enzyme treatments, starch infusion and/or ultrasound treatment.

20 Claims, No Drawings

CRISPY FRENCH FRIES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

Related Applications

For purposes of the USPTO extra-statutory requirements, the present application constitutes a continuation of U.S. patent application Ser. No. 12/924,039, entitled CRISPY FRENCH FRIES, naming Maxime Jean Jerome Bilet; Nathan P. Myhrvold; M.G. Johnny Zhu as inventors, filed 17, Sep., 2010, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

TECHNICAL FIELD

The present application relates, in general, to culinary science and food preparation technology. In particular, the application relates to deep fried food products.

DESCRIPTION

Attention is being given to preparing crispy deep fried food products (e.g., chips, French fries. etc).

The deep fried food products (herein after "French fry-style food product of "French fries") may be prepared, for example, from fresh potatoes that are peeled, sliced and cooked in kitchens. In the fast food industry, local stores or restaurants acquire frozen fresh, blanched or par-cooked food product that has been cut, pre-sliced, or otherwise formed in to a suitable shape (e.g. strips, cubes or slices). The local stores or restaurants defrost and "finish" deep-fry the par-cooked food product in edible oil before serving it as French fries.

Heat causes hydration and expansion of starch granules in the food product, which a consumer may experience as cooked texture and flavor. Rapid heating removes water from the outer layers of the deep fried product, which may give rise to the formation of a crisp but light and expanded material. Maillard browning reactions (see Whistler, R. I. and Daniel, J. R. 1985, Carbohydrates in "Food Chemistry" Second Edition, Marcel Dekker Inc. New York, Owen R. Fennema ed., pg. 96-105) between amino groups of amino acids and small amounts of sugars in the potato product give the golden color and a toasted flavor which are characteristic of freshly prepared French fries. Some conventional cooking recipes call for coating or pre-coating the food products with batter slurry or other coating material (e.g. a sugar solution) for flavor and to give a golden coloring. Further, batter slurry or other coating material may include ingredients that resist rehydration and prolong the crispiness of the finished food products, for example, when they are subject to conditions of high heat and humidity. Reducing the rehydration may inhibit the food product from becoming undesirably limp, soggy or tough and hold its crispiness quality for an extended period of time. Examples of rehydration-resistant coating materials include a hydrocolloid pre-coating applied prior to coating the food product with a batter; an aqueous slurry containing chemically modified, ungelatinized potato starch, chemically modified, ungelatinized corn starch, and rice flour; a coating of high amylose starch; a glaze coating of hydrolyzed starch; a batter mix containing a leavening agent, a blend of starch and high amylose starch, dextrin and a food gum; and a slurry of corn flour, corn starch and low solubility dextrin.

Specific EXAMPLES I-IV of "crispy" French fry-style food products and methods for making the same are presented herein. It will be understood that EXAMPLES I-IV are presented only for purposes of illustration and are not intended to limit the scope of the disclosure.

The cooking methods described herein may be exploited to prepare small quantities (e.g., individual food servings prepared in home kitchens) and/or large quantities (e.g., commercial food servings prepared in industrial kitchens or other commercial food processing industry).

The preparation of the French fry-style food products may be carried out in increments or stages. Pre-cooked or partially cooked intermediate items may be stored (e.g., frozen or unfrozen) for later cooking to completion. One or more of the cooking increments or stages may involve "sous-vide" cooking, which is a cooking technique that is intended to maintain the integrity of ingredients by heating them for an extended period at relatively low temperatures. In sous-vide cooking, the food products (e.g., potato cuts or strips) may be cooked for a time in airtight containers (e.g., airtight plastic bags) placed in hot water at or below its boiling point (100° C.).

The preparation of the French fry-style food products described herein involve modification of the water content and the texture of the products' surface layers prior to deep frying in order to obtain suitable crispiness in the finished products. Surface modifications may include surface firming using, for example, enzyme treatments and/or starch infusion. Additional or alternate surface modifications involve application of ultrasound. Surface modifications may also involve control of the water content of the surface layers by drying or desiccation prior to deep frying.

The following non-limiting EXAMPLES I-IV illustrates intermediate- and finish-cooked crispy French fry-style vegetable products, and the methods of preparing the same.

EXAMPLE I

Pectinase-Steeped Crispy Fries

Pectinase-steeped crispy French fries were prepared.

Russet potatoes (500 g) were cut into batons about 1.5 cm thick and thoroughly rinsed in water to wash away native surface starch. The rinsed potatoes were treated with approximately ½% solution of a surface-firming enzyme (e.g. a pectic enzyme). The surface-firming enzyme solution was prepared by mixing 2 g of Pectinex Ulta SP-L in 500 g of water. After soaking or steeping the rinsed potato batons in the pectinase-solution for approximately 60 minutes, the solution was drained.

Next, the surface-treated potato batons were par-cooked. The surface-treated batons were arranged in one even layer inside a vacuum-sealed container with about 500 g of water and about 10 g of salt to taste. The surface-treated potato batons were steamed (par-Cooked) at 100° C. for about 15 minutes inside the container. After steaming, the water in the container was carefully drained and the par-cooked potato batons cooled.

Next, the par-cooked potato batons were further cooked through by blanching. The blanching also desiccated the surface layers of the par-cooked potato batons making them more suitable for storage and/or subsequent finish cooking. For example, the par-cooked potato batons were blanched in hot oil (about 170° C.) for about 3 minutes and then cooled. The oil-blanching process removed water from the surface layers of the par-cooked potato batons, for example, to help preserve or improve flavor and texture.

Finally, crispy pectinase-steeped French fries were obtained by deep frying the blanched potato batons in oil heated to approximately 190° C. for approximately 3 minutes and immediately transferred onto paper towels to drain any excess frying oil adhering to the fries. This process yielded about 350 g of suitably crisp and flavorful fries ready for serving.

EXAMPLE II

Starch-Compressed Crispy Fries

Crispy French fries with compressed-starch outer surface layers were prepared.

Russet potatoes (500 g) were cut into batons about 1.5 cm thick and thoroughly rinsed in water to wash away native surface starch. The surfaces of the rinsed potato batons were firmed up by a starch infusion process. In the starch infusion process, the rinsed potato batons were treated with a starch solution in a controlled environment. An approximately 50% water-based starch mixture was prepared by whisking 50 g of potato starch in 100 g of water. The rinsed potato batons and the starch mixture were combined in a container (e.g., a refrigerated container). A vacuum was drawn on the container to help compress/infuse starch into the surface layers. After treatment for about 30 minutes in a refrigerated vacuum-sealed container, the starch mixture was drained.

Next, the starch-infused potato batons were par-cooked. The starch-infused potato batons were arranged in one even layer and vacuum sealed in container with about 500 gm of water and salt (e.g., 10 g). The starch-infused potato batons in the container were steamed (par-cooked) at 100° C. for about 15 minutes. After steaming, the water in the container was carefully drained.

Next, the surface layers of the par-cooked potato batons were desiccated making them more suitable for storage and/or subsequent finish cooking. For example, the par-cooked potato batons were further dried in a vacuum sealer. For this purpose, the par-cooked potato batons (e.g., while hot) were placed on a wire rack in the vacuum sealer and vacuum pulled until the surfaces of the batons were suitably dry.

Then, the desiccated/dried potato batons were cooked through by blanching. The desiccated potato batons were blanched in hot oil (about 170° C.) for about 3 minutes and then cooled. The oil-blanching process may have further removed water from the par-cooked/desiccated potato batons making them suitable for storage or subsequent finish cooking and, for example, to preserve or improve flavor and texture.

Finally, crispy starch-compressed French fries were obtained by deep frying the blanched potato batons in oil heated to approximately 190° C. for approximately 3 minutes and immediately transferred onto paper towels to drain any excess frying oil adhering to the fries. This process yielded about 350 g of suitably crisp and flavorful fries ready for serving.

EXAMPLE III

Ultrasonic Treated Crispy Fries

Crispy ultrasonic treated French fries were prepared.

Russet potatoes (500 g) were cut into batons about 1.5 cm thick and thoroughly rinsed in water to wash away native surface starch. Next, the rinsed potato batons were par-cooked. The batons were arranged in one even layer inside a vacuum-sealed container with about 500 g of water and about 10 g of salt. The rinsed potato batons in the container were steamed (par-cooked) at 100° C. for about 15 minutes, cooled and reserved.

Next, the par-cooked potato batons in the vacuum-sealed container were treated with ultrasound in a commercially available ultrasonic bath (Bransonic(R) Model 8510 Ultrasonic Bath sold Branson, 41 Eagle Rd., P.O. Box 1961, Danbury, Conn. 06813-1961). The nominal specifications of the Bransonic(R) Model 8510 ultrasonic bath used include: Tank Size (L-W-D): (19.5"-11.5"-6"); Overall Size (L-W-D): (24"-18"-14.5"); Tank Capacity: 5.5 gals; Weight: 26 lbs; Max. Input Power: 561 watts; Max Draw Power Req.: 881 watts; and Operating Frequency: 40 kHz.

The vacuum-sealed container with the par-cooked potato batons was placed in the ultrasound bath set to cavitate at full power for about 30 minutes. The ultrasound was expected to change the surface texture of the ultrasound treated potato batons, for example, by creating surface fissures and/or ridges on the so treated potato batons. The ultrasound treated potato batons were then further par cooked in the vacuum-sealed container by reheating to about 100° C. for about 5 minutes. After the reheating, water was carefully drained and the par-cooked ultrasonically treated potato batons cooled.

Next, the fissured surface layers of the par-cooked ultrasound-treated potato batons were desiccated making them more suitable for storage and/or subsequent finish cooking. For example, the par-cooked ultrasound-treated potato batons were further dried in a vacuum sealer. For this purpose, the par-cooked ultrasound-treated potato batons (e.g., while hot)

were placed on a wire rack inside the vacuum sealer and vacuum pulled until the surface or surface layers of the potato batons were suitably dry.

Then, the desiccated potato batons were cooked through by blanching in hot oil heated to about 170° C. for about 3 minutes and then cooled. The oil-blanching process further removed water from the par-cooked/desiccated potato batons making them suitable for storage or subsequent finish cooking and, for example, to preserve or improve flavor and texture.

Finally, crispy ultrasonic treated French fries were obtained by deep frying the blanched potato batons in oil heated to about 190° C. for about 3 minutes and immediately transferred onto paper towels to drain any excess frying oil adhering to the fries. This process yielded about 350 g of suitably crisp and flavorful fries ready for serving.

EXAMPLE IV

Ultrasonic Treated Starch-Compressed Crispy Fries

Crispy ultrasonic treated starch-compressed French fries were prepared.

Russet potatoes (500 g) were cut into batons about 1.5 cm thick and thoroughly rinsed in water to wash away native surface starch. Next, the rinsed potato batons were par-cooked. The batons were arranged in one even layer inside a vacuum-sealed container with about 500 g of water and about 10 g of salt. The rinsed potato batons were steamed (par-cooked) at 100° C. for about 15 minutes inside the container.

The surfaces of the par-cooked potato batons were treated with a starch solution in a controlled environment to infuse starch into and firm up the surface layers after or while treating the surfaces with ultrasound. For this treatment, an approximately 50% water-based starch mixture was prepared by whisking 50 g of potato starch in 100 g of water. The par-cooked potato batons and the starch mixture were combined in a vacuum-sealable container. A vacuum was then drawn on the container to help compress/infuse starch into the surface layers. The container was placed in the Model 8150 ultrasound bath set to cavitate at full power for about 30 minutes. The ultrasound changes the surface texture of the ultrasound treated potato batons, for example, by creating surface fissures and/or ridges on the potato batons. Starch from the starch mixture was then infused/compressed into these surface fissures during the ultrasound treatment. After treatment with ultrasound for about 30 minutes in the vacuum-sealed container, the starch mixture was drained.

Next, the surface layers of the starch-compressed ultrasound-treated potato batons were desiccated making them more suitable for storage and/or subsequent finish cooking. For example, the starch-compressed ultrasound-treated potato batons were further dried in a vacuum sealer. For this purpose, the starch-compressed ultrasound-treated potato batons (e.g., while hot) were placed on a wire rack inside the vacuum sealer and vacuum pulled until the surfaces of the potato batons were suitably dry.

Then, the desiccated potato batons were further cooked through by blanching. The desiccated potato batons were blanched in hot oil at about 170° C. for about 3 minutes and then cooled. The oil-blanching process further removed water from the par-cooked/desiccated potato batons making them suitable for storage or subsequent finish cooking and, for example, to preserve or improve flavor and texture.

Finally, crispy starch-compressed ultrasound-treated French fries were obtained by deep frying the blanched potato batons in oil heated to about 190° C. for about 3 minutes and immediately transferred onto paper towels to drain any excess frying oil adhering to the fries. This process yielded about 350 g of suitably crisp and flavorful fries ready for serving.

While various aspects and embodiments have been disclosed herein, other aspects and embodiments will be apparent to those skilled in the art. For example, in Examples II and IV excellent crispy textured fries may be obtained by placing the potato batons on one side in the ultrasonic bath for about 30-45 minutes and then flipping over the potato batons onto the other side for another 30-45 minutes of ultrasound treatment. It will be understood the various aspects and embodiments disclosed herein are for purposes of illustration and are not intended to be limiting, with the true scope and spirit being indicated by the following claims.

The invention claimed is:

1. A method of preparing vegetable pieces, comprising:
   sous vide cooking the vegetable pieces; and
   increasing the number of surface fissures in the sous vide cooked vegetable pieces by treating the sous vide cooked vegetable pieces with ultrasound for at least 30 minutes, and deep frying in oil heated to about 190° C. for about 1 to 5 minutes.

2. The method of claim 1, wherein the vegetable pieces are potato pieces.

3. The method of claim 1, further including removing at least a portion of native surface starch from the vegetable pieces prior to sous vide cooking the vegetable pieces.

4. The method of claim 1, wherein treating the sous vide cooked vegetable pieces with ultrasound includes placing the sous vide cooked vegetable pieces in an ultrasound bath.

5. The method of claim 1, wherein treating the sous vide cooked vegetable pieces with ultrasound includes placing the sous vide cooked vegetable pieces in a heated ultrasound bath.

6. The method of claim 1, wherein sous vide cooking the vegetable pieces includes sealing the vegetable pieces in a container and immersing the container in a water bath.

7. The method of claim 6, wherein immersing the container in a water bath comprises immersing the container in the water bath heated to a temperature at or below the boiling point of water.

8. The method of claim 1, further including at least partially desiccating the ultrasound treated vegetable pieces.

9. The method of claim 8, wherein at least partially desiccating the ultrasound treated vegetable pieces includes pulling a vacuum on the vegetable pieces.

10. The method of claim 8, wherein at least partially desiccating the ultrasound treated vegetable pieces includes placing the vegetable pieces on a hot rack in a vacuum sealer.

11. The method of claim 8, wherein at least partially desiccating the ultrasound treated vegetable pieces includes blanching the vegetable pieces in oil.

12. The method of claim 8, wherein at least partially desiccating the ultrasound treated vegetable pieces includes blanching the vegetable pieces in oil at or about 170° C.

13. The method of claim 1, further including storing the ultrasound treated vegetable pieces.

14. The method of claim 13, wherein storing the ultrasound treated vegetable pieces includes packing the vegetable pieces in a container, removing air, and sealing.

15. The method of claim 13, wherein storing the ultrasound treated vegetable pieces includes freezing the vegetable pieces.

16. The method of claim 1, further including draining oil from the deep fried vegetable pieces.

17. The method of claim 1, further including serving the deep fried vegetable pieces as a food serving.

18. A method of preparing vegetable pieces, comprising:

rinsing the vegetable pieces and soaking the rinsed vegetable pieces in a pectinase solution for about 60 minutes;

placing the vegetable pieces and water in a vacuum sealed bag;

placing the vacuum sealed bag in a heated water bath at about 100° C. for greater than about 1-5 minutes;

further treating the vegetable pieces with ultrasound for at least about 30 minutes;

placing the ultrasound treated vegetable pieces on a hot wire rack in a vacuum sealer to dry their surface;

blanching the dried-surface vegetable pieces in oil at about 150-190° C. for about 1-5 minutes; and cooling and storing the blanched vegetable pieces.

19. The method of claim 18, further including deep frying the blanched vegetable pieces.

20. The product made by the method of claim 1, wherein the treated vegetable product has more surface fissures than an untreated vegetable piece.

* * * * *